United States Patent
Becker

(10) Patent No.: US 11,085,828 B2
(45) Date of Patent: Aug. 10, 2021

(54) DEVICE FOR DETECTING ELECTROMAGNETIC RADIATION WITH REDUCED CROSSTALK

(71) Applicant: COMMISSARIAT A L'ENERGIE ATOMIQUE ET AUX ENERGIES ALTERNATIVES, Paris (FR)

(72) Inventor: Sebastien Becker, Voiron (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/765,385

(22) PCT Filed: Nov. 19, 2018

(86) PCT No.: PCT/FR2018/052903
§ 371 (c)(1),
(2) Date: May 19, 2020

(87) PCT Pub. No.: WO2019/102121
PCT Pub. Date: May 31, 2019

(65) Prior Publication Data
US 2020/0340864 A1    Oct. 29, 2020

(30) Foreign Application Priority Data
Nov. 21, 2017   (FR) ..................................... 17 60961

(51) Int. Cl.
*G01J 5/06*    (2006.01)
*G01J 5/02*    (2006.01)
(Continued)

(52) U.S. Cl.
CPC ................. *G01J 5/06* (2013.01); *G01J 5/024* (2013.01); *G01J 5/0809* (2013.01); *G01J 5/24* (2013.01); *G01J 2005/202* (2013.01)

(58) Field of Classification Search
CPC .. G01J 5/06; G01J 5/024; G01J 5/0809; G01J 5/24; G01J 2005/202; G01J 5/20; G01J 5/0225
See application file for complete search history.

(56) References Cited

U.S. PATENT DOCUMENTS 8,153,976 B2 *  4/2012  Lee ..................... H01L 31/0203
                                                          250/338.1
8,816,283 B2     8/2014  Yon et al.
(Continued)

FOREIGN PATENT DOCUMENTS

EP    3 067 674 A2    9/2016
FR    2 966 595 A1    4/2012

OTHER PUBLICATIONS

International Search Report dated Mar. 26, 2019 in PCT/FR2018/052903 filed Nov. 19, 2018, 2 pages.

*Primary Examiner* — Christine S. Kim
(74) *Attorney, Agent, or Firm* — Oblon, McClelland, Maier & Neustadt, L.L.P.

(57) ABSTRACT

The invention concerns a detection device for detecting electromagnetic radiation, comprising a substrate, an array of thermal detectors, each thermal detector comprising a suspended absorbent membrane and a reflective layer. The detection device comprises at least one opaque vertical wall, arranged on the substrate and extending longitudinally between two adjacent thermal detectors, and produced from a material that is opaque to the electromagnetic radiation to be detected.

13 Claims, 9 Drawing Sheets

(51) Int. Cl.
    *G01J 5/08*         (2006.01)
    *G01J 5/24*         (2006.01)
    *G01J 5/20*         (2006.01)

(56) References Cited

U.S. PATENT DOCUMENTS

| | | |
|---|---|---|
| 9,933,309 B2 | 4/2018 | Yon et al. |
| 2004/0217264 A1 | 11/2004 | Wood et al. |
| 2008/0216883 A1* | 9/2008 | Leneke ................ H04N 5/2253 |
| | | 136/224 |
| 2013/0240738 A1 | 9/2013 | Yon et al. |
| 2015/0372162 A1* | 12/2015 | Nemirovsky ........... G01J 5/045 |
| | | 257/467 |
| 2016/0238439 A1* | 8/2016 | Chu ................... H01L 31/02327 |
| 2016/0245701 A1 | 8/2016 | Yon et al. |
| 2017/0328778 A1 | 11/2017 | Kobayashi et al. |
| 2019/0265105 A1* | 8/2019 | Simon ....................... G01J 5/12 |
| 2019/0355769 A1* | 11/2019 | Yajima .............. H01L 27/14603 |

* cited by examiner

Background

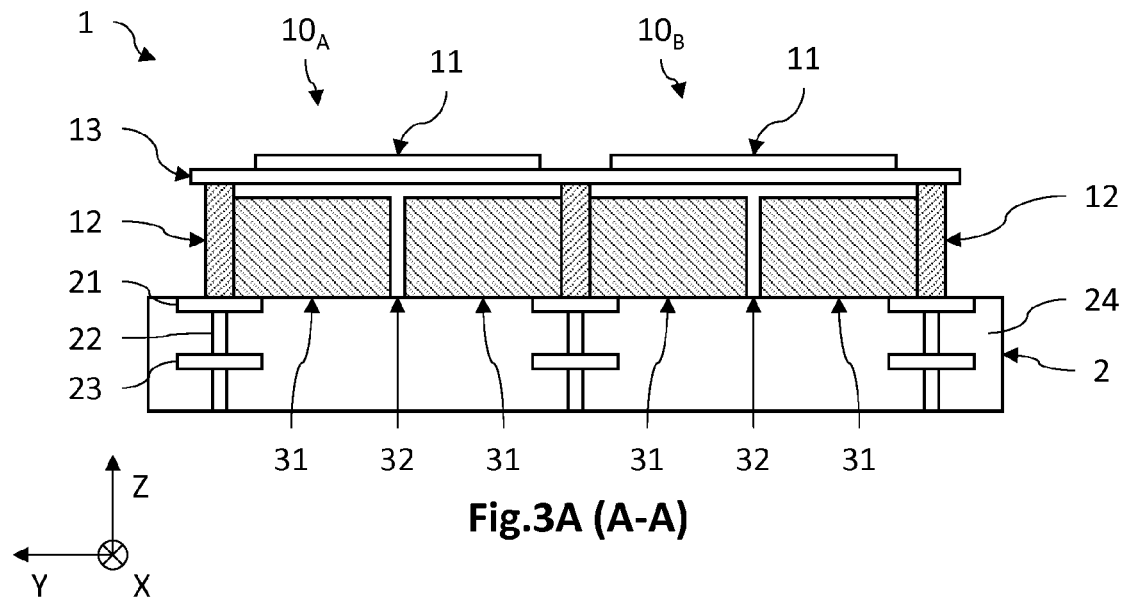
Fig.3A (A-A)
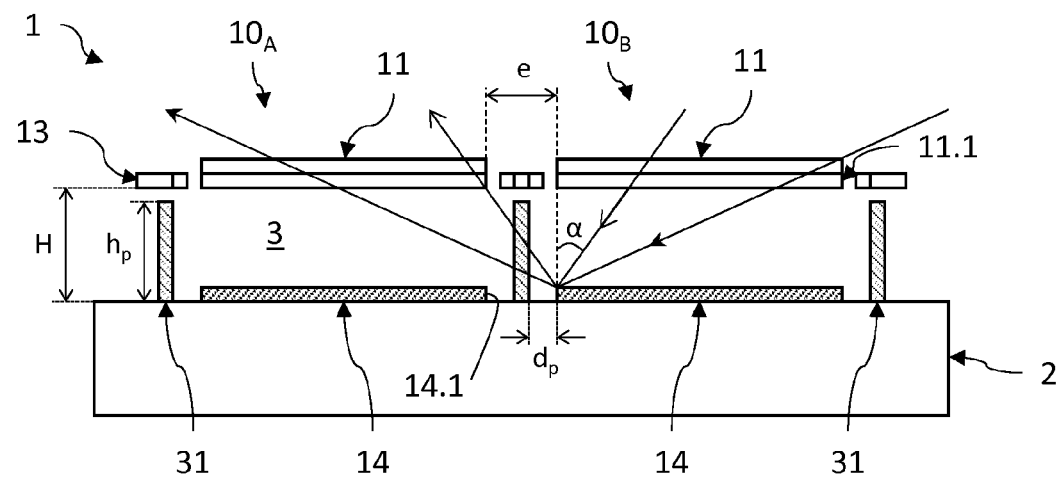
Fig.3B (B-B)

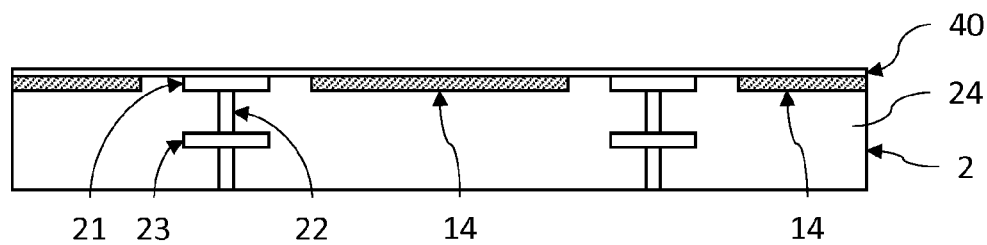
Fig.4A (C-C)
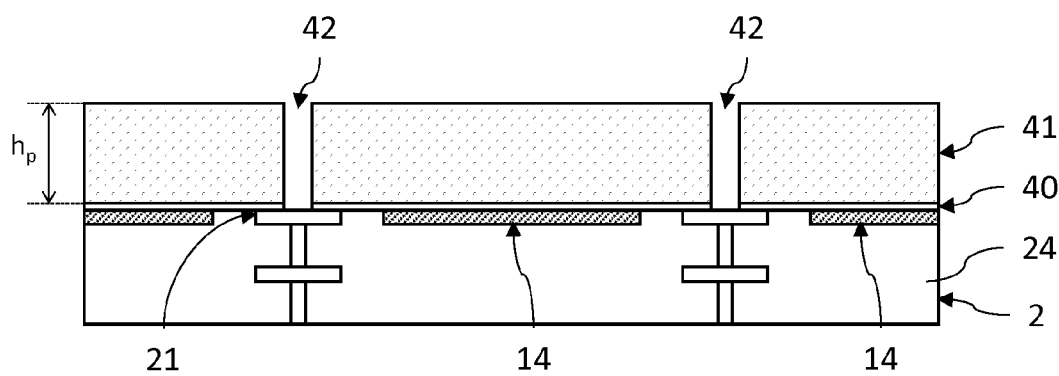
Fig.4B (C-C)
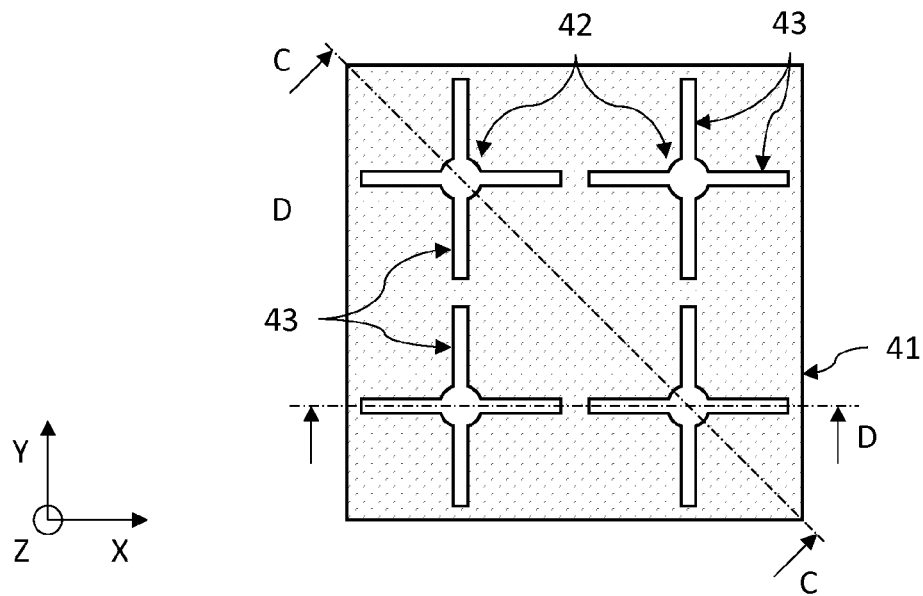
Fig.4C

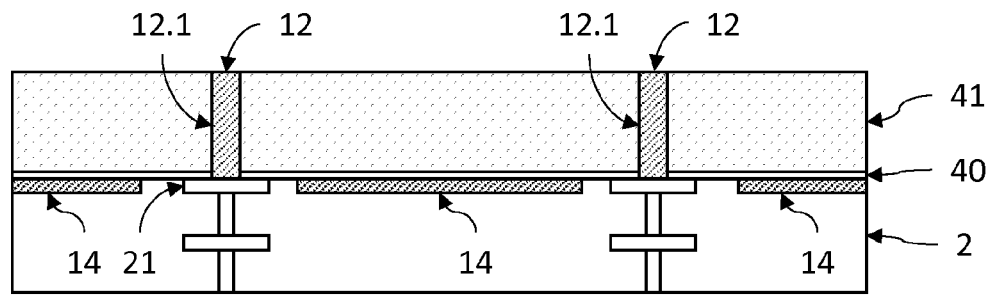
Fig.4D (C-C)
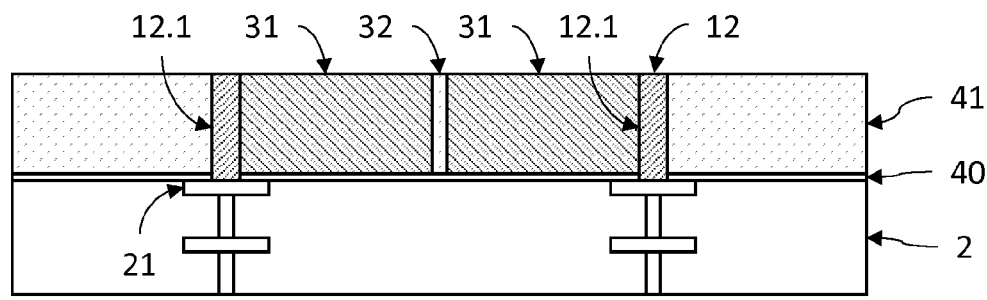
Fig.4E (D-D)
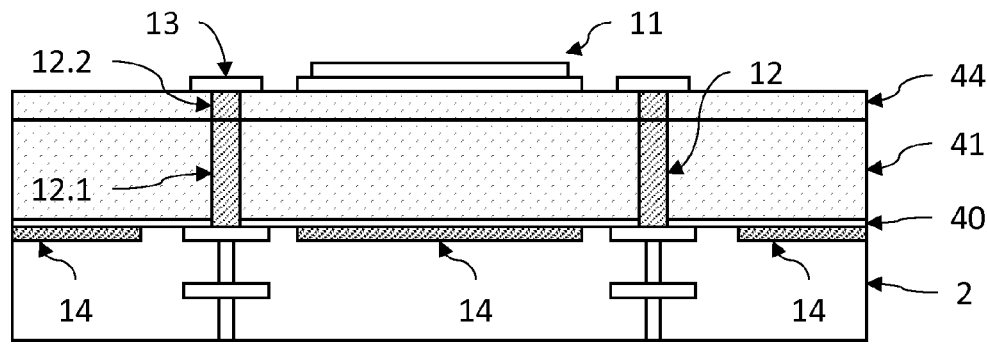
Fig.4F (C-C)
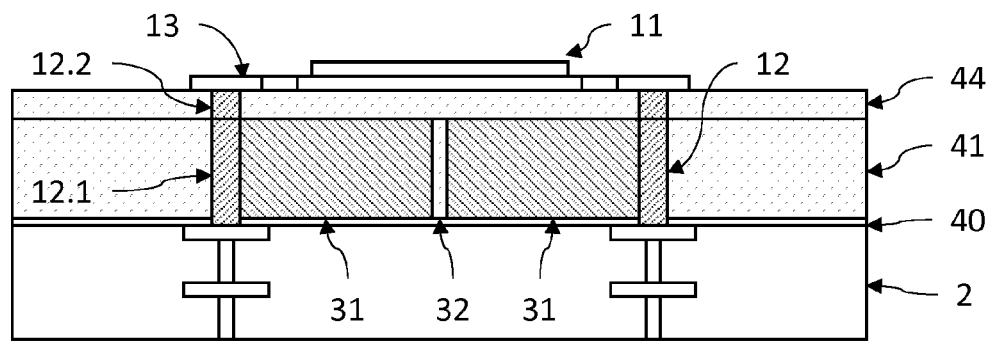
Fig.4G (D-D)
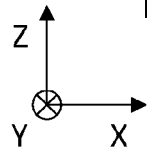

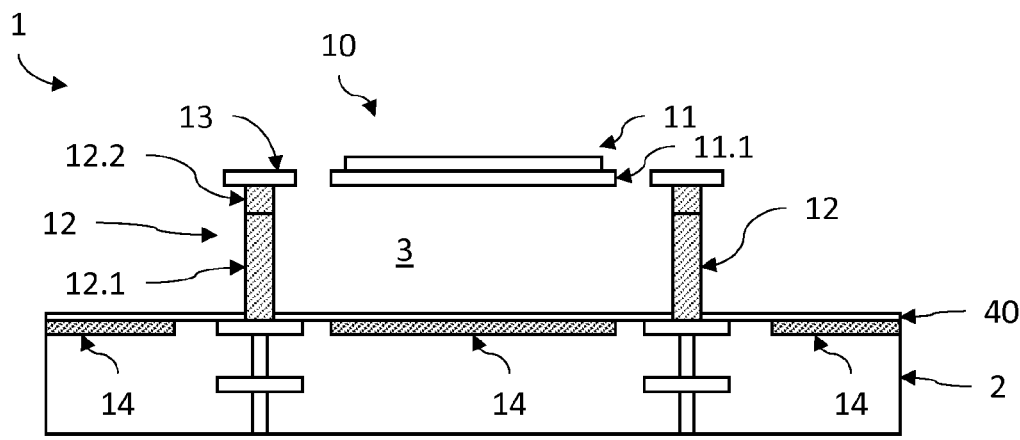
Fig.4H (C-C)
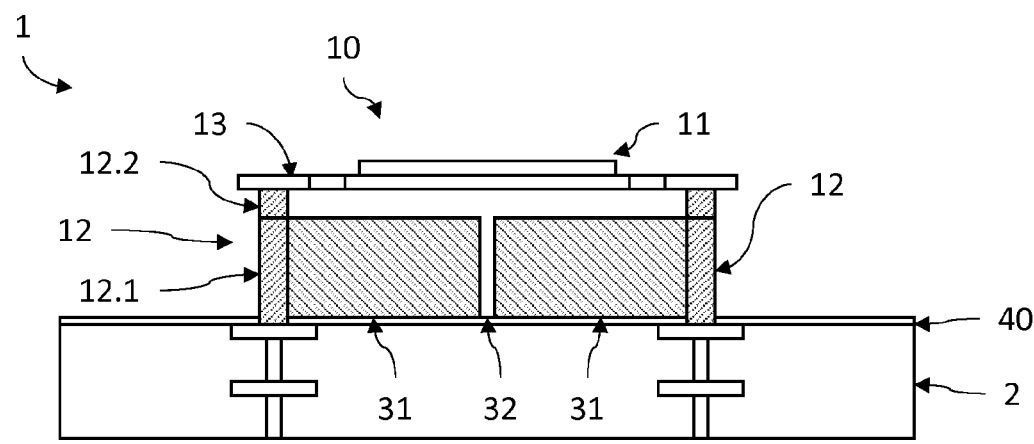
Fig.4I (D-D)

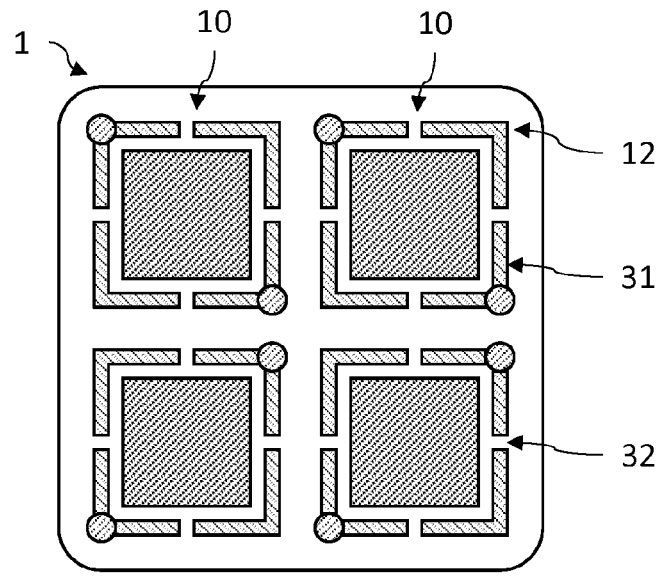
Fig.5A
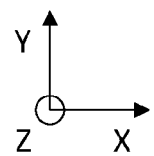
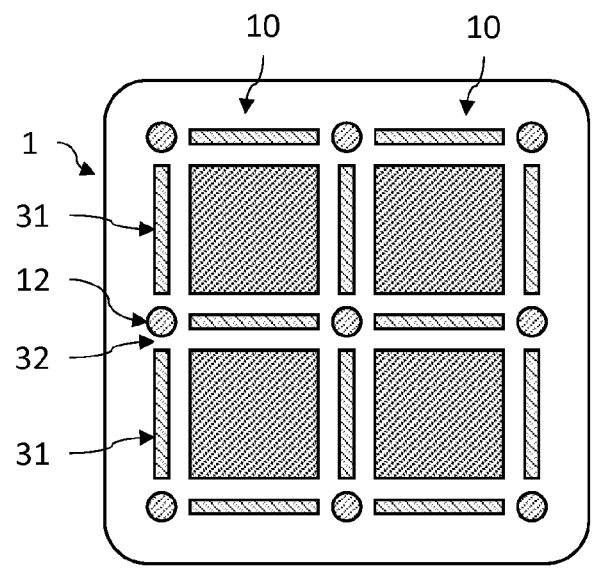
Fig.5B

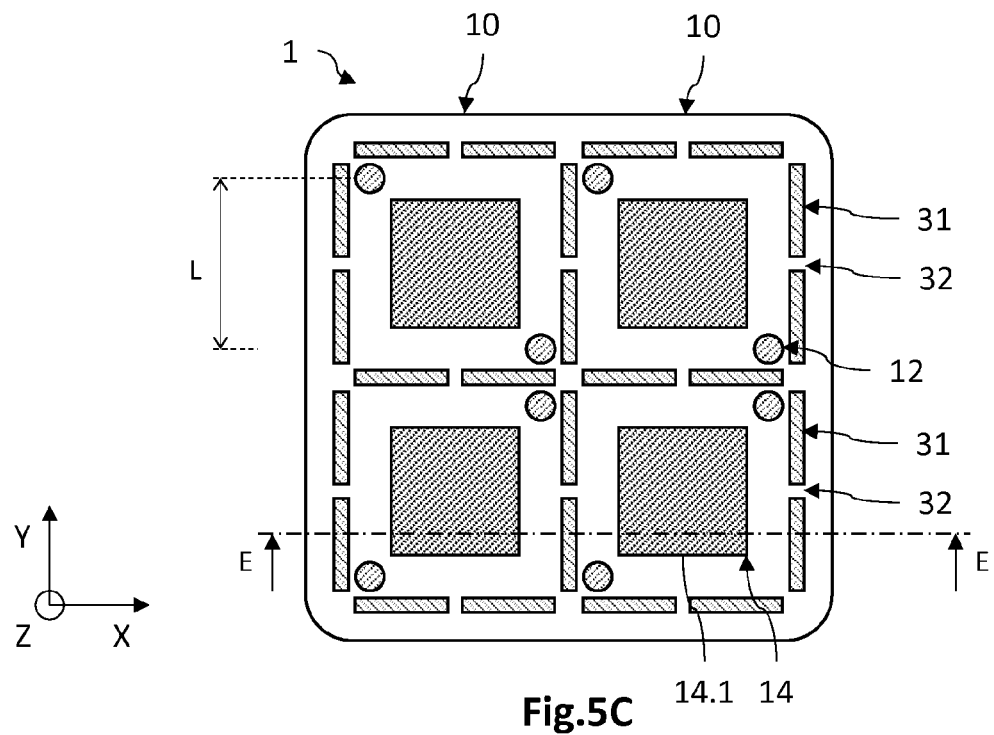
Fig.5C
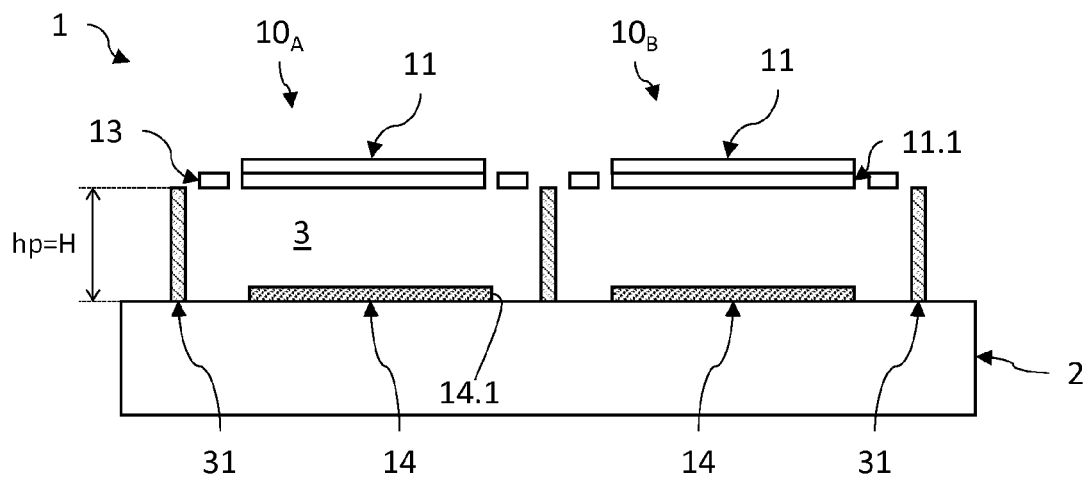
Fig.5D (E-E)

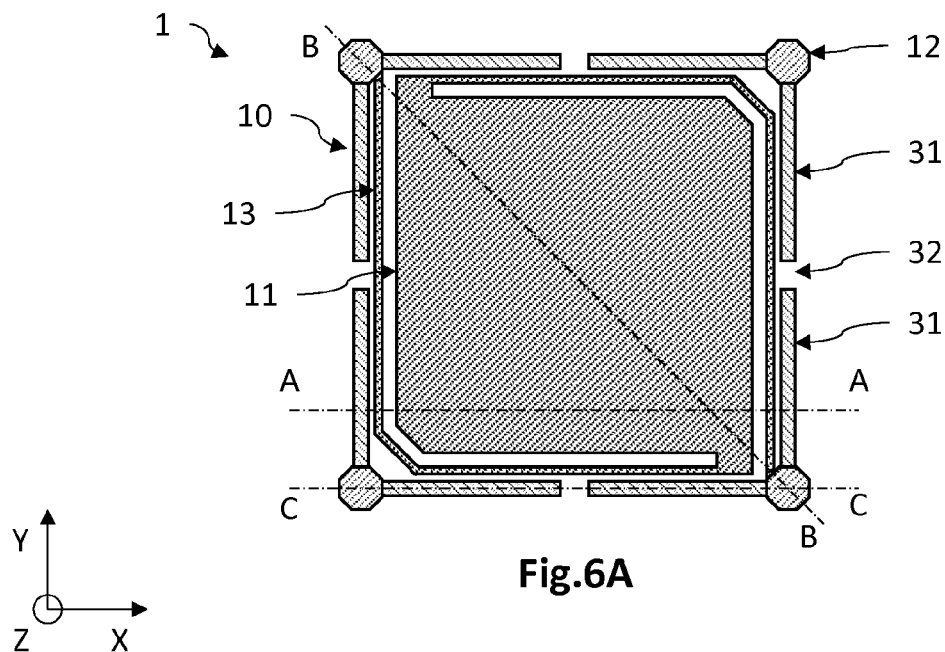
Fig.6A
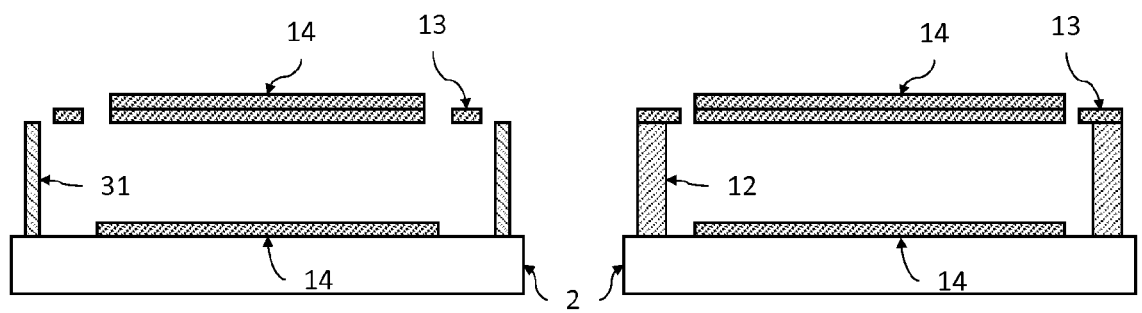
Fig.6B (A-A)          Fig.6C (B-B)
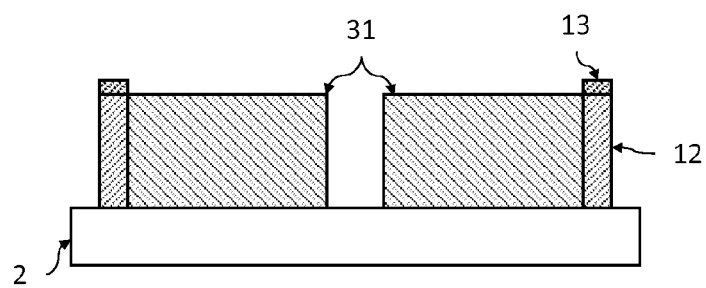
Fig.6D (C-C)

DEVICE FOR DETECTING ELECTROMAGNETIC RADIATION WITH REDUCED CROSSTALK

TECHNICAL FIELD

The field of the invention is that of the devices for detecting electromagnetic radiation, in particular infrared, comprising a matrix of thermal detectors with absorbent membranes suspended above the substrate. The invention applies notably to the field of infrared imaging and thermography.

STATE OF THE ART

A device for detecting electromagnetic radiation, for example infrared, usually comprises a matrix of thermal detectors, forming a plurality of sensitive pixels, each comprising a portion that can absorb the electromagnetic radiation to be detected.

In order to ensure the thermal insulation of the thermal detectors, the absorbent portions usually take the form of membranes suspended by anchoring pillars above the substrate, and thermally insulated therefrom by holding arms and thermal insulation. These anchoring pillars and holding arms also provide an electrical function by electrically linking the absorbent membranes of a readout circuit generally disposed in the substrate.

FIG. 1 illustrates an example of a thermal detector 10 of such a detection device 1. Each absorbent membrane 11 of the sensitive pixels is suspended above the substrate 2 at a non-zero distance therefrom. To enhance the absorption of the electromagnetic radiation to be detected, a reflective layer 14 can be disposed on the substrate 2 facing the absorbent membrane 11. The spacing between the absorbent membrane 11 and the reflective layer 14 is then chosen to form a quarter-wave cavity that is resonant for a reference wavelength lying within the range of the wavelengths of the electromagnetic radiation to be detected.

There is however a need to have such detection devices available in which the crosstalk is reduced.

SUMMARY OF THE INVENTION

The object of the invention is to at least partly remedy the drawbacks of the prior art, and more particularly to propose a device for detecting electromagnetic radiation, for example infrared, which exhibits reduced crosstalk.

For that, the subject of the invention is a device for detecting electromagnetic radiation, comprising:
 a substrate, comprising a readout circuit;
 a matrix of thermal detectors intended to absorb the electromagnetic radiation to be detected, disposed on the substrate, each thermal detector comprising:
  an absorbent membrane suspended above the substrate by anchoring pillars disposed on and in contact with the substrate, and by holding arms, the anchoring pillars and the holding arms ensuring an electrical connection of the absorbent membrane to the readout circuit, and
  a reflective layer disposed on the substrate facing the absorbent membrane.
 According to the invention, the detection device comprises at least one opaque vertical wall, disposed on and in contact with the substrate and extending longitudinally between two adjacent thermal detectors, and produced in a material that is opaque to the electromagnetic radiation to be detected.

Furthermore, the opaque vertical wall extends longitudinally along an axis passing through two neighboring anchoring pillars. In other words, the opaque vertical wall extends coaxially to an axis passing through two neighboring pillars. Moreover, each anchoring pillar is a structure having a height, along an axis orthogonal to a plane parallel to the substrate, greater than its dimensions in the plane parallel to the substrate. "Disposed on the substrate" is understood to mean resting on the substrate along an axis orthogonal to a plane parallel to the substrate.

The opaque vertical wall is, moreover, produced in a single piece with at least one anchoring pillar. Each opaque vertical wall is advantageously produced in the same material or materials as the anchoring pillars.

Some preferred, but nonlimiting aspects of this detection device are as follows.

Each thermal detector can be surrounded, in a plane parallel to the substrate, by opaque vertical walls. It can be surrounded continuously or discontinuously.

Each thermal detector can comprise four anchoring pillars. Each of the sides of the absorbent membrane, in a plane parallel to the substrate, is bordered by at least two opaque vertical walls at a distance from one another along their longitudinal axis. The two opaque vertical walls extend preferably coaxially.

The opaque vertical wall can be at a distance from the holding arms and from the absorbent membrane. The evacuation of the sacrificial layer used for the production of the thermal detectors is thus made possible. Furthermore, the thermal insulation of the absorbent membranes is not disturbed by the presence of the opaque vertical wall.

The detection device can comprise a plurality of opaque vertical walls. At least two opaque vertical walls can extend longitudinally between the absorbent membranes of the two adjacent thermal detectors, said opaque vertical walls being at a distance from one another along their longitudinal axis.

Said opaque vertical walls can be at a distance from one another along their longitudinal axis by a distance less than or equal to $\lambda_o/10$, $\lambda_o$ being a central wavelength of a range of wavelengths of the electromagnetic radiation to be detected.

Said distance can be less than or equal to 1.4 μm.

One and the same thermal detector can be surrounded by a plurality of opaque vertical walls that are distinct from one another and spaced apart from one another by a non-zero distance.

The opaque material can exhibit a transmission of the electromagnetic radiation to be detected less than or equal to 5%, and preferably less than or equal to 1%.

The electromagnetic radiation to be detected can exhibit a range of wavelengths of from 8 μm to 14 μm.

One or more consecutive opaque vertical walls can border one and the same side of a thermal detector over at least 50% of the length of the side.

The invention also relates to a method for fabricating a detection device according to any of the preceding features. The method comprises the following steps:
 supplying the substrate;
 depositing a sacrificial layer on the substrate;
 producing at least one opaque vertical wall and anchoring pillars through the sacrificial layer;
 producing the holding arms and the absorbent membrane on the sacrificial layer;
 eliminating the sacrificial layer.

The anchoring pillars and the opaque vertical wall are advantageously produced simultaneously and in the same material or materials.

The opaque vertical wall advantageously has a height, along an axis orthogonal to a plane parallel to the substrate, that is substantially equal to that of the anchoring pillars.

BRIEF DESCRIPTION OF THE DRAWINGS

Other aspects, aims, advantages and features of the invention will become more apparent on reading the following detailed description of preferred embodiments thereof, given as nonlimiting examples and with reference to the attached drawings in which:

FIGS. 3A and 3B are schematic views of the detection device illustrated in FIGS. 2A and 2B, along the cutting plane A-A (FIG. 3A) and along the cutting plane B-B (FIG. 3B);

FIGS. 4A to 4I are schematic views in cross section of different steps of a method for fabricating a detection device according to a variant embodiment;

FIGS. 5A to 5C are plan schematic views of different detection devices according to variant embodiments, and FIG. 5D is a schematic view of the variant illustrated in FIG. 5C along the cutting plane E-E;

FIG. 6A is a plan schematic view of a detection device according to a variant embodiment, and FIGS. 6B, 6C, 6D are schematic views in cross section of the variant illustrated in FIG. 6A along different cutting planes.

DETAILED DESCRIPTION OF PARTICULAR EMBODIMENTS

In the figures and hereinafter in the description, the same references represent elements that are identical or similar. Furthermore, the different elements are not represented to scale so as to prioritize the clarity of the figures. Moreover, the different embodiments and variants are not mutually exclusive and can be combined with one another. Unless indicated otherwise, the terms "substantially", "approximately", "of the order of" mean to within 10%. Moreover, the expression "comprising a" should be understood to mean "comprising at least one", unless indicated otherwise.

Figure 1:
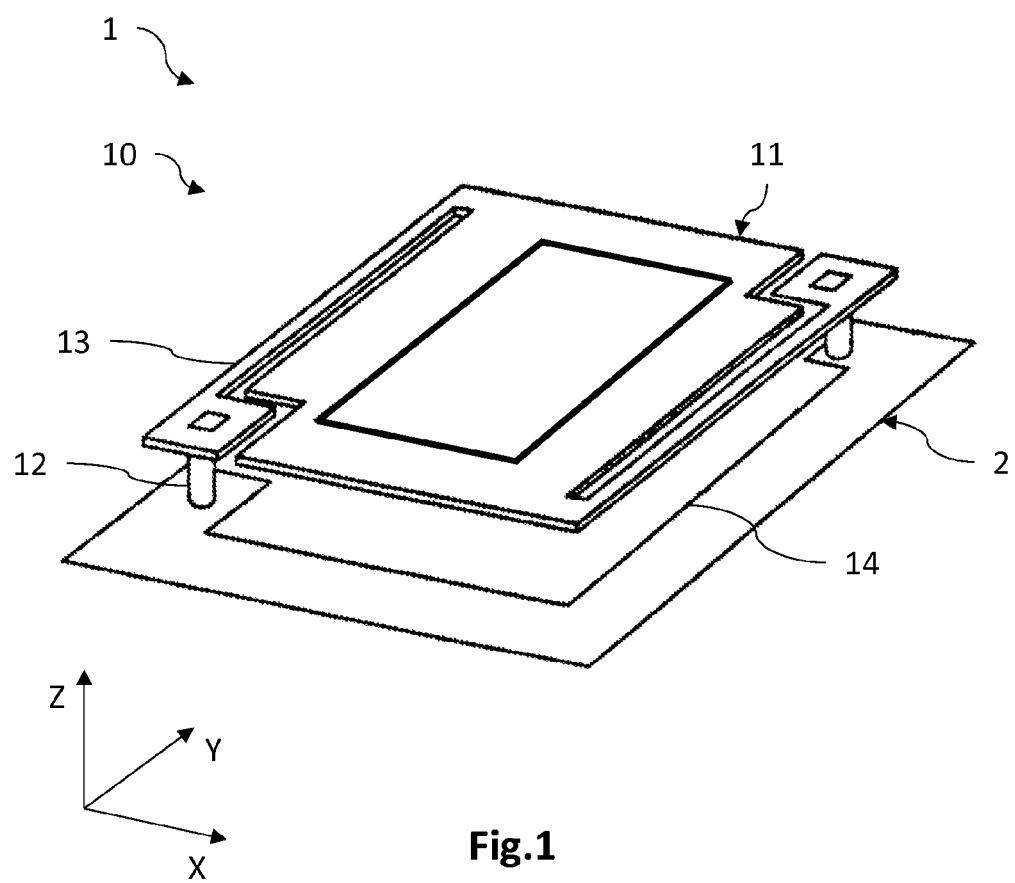
FIG. 1, already described, is a perspective schematic view of a thermal detector of a detection device according to an example of the prior art.
Figure 2A:
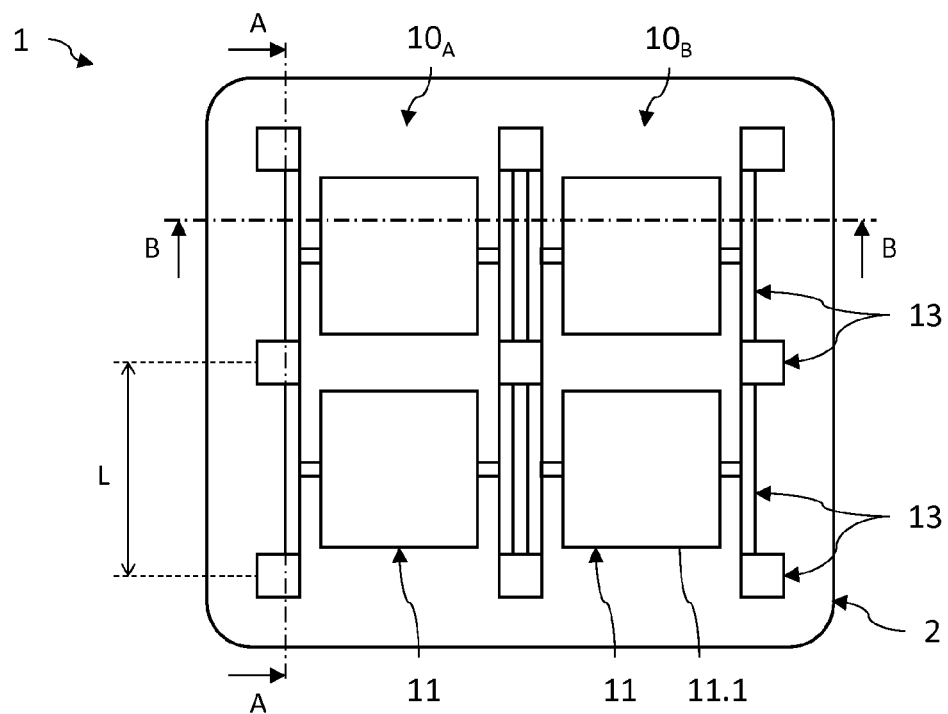
FIGS. 2A and 2B are plan schematic views of a detection device according to an embodiment, illustrating the suspended absorbent membranes of the sensitive pixels (FIG. 2A) and the reflective layers separated by opaque vertical walls (FIG. 2B)
Figure 2B:
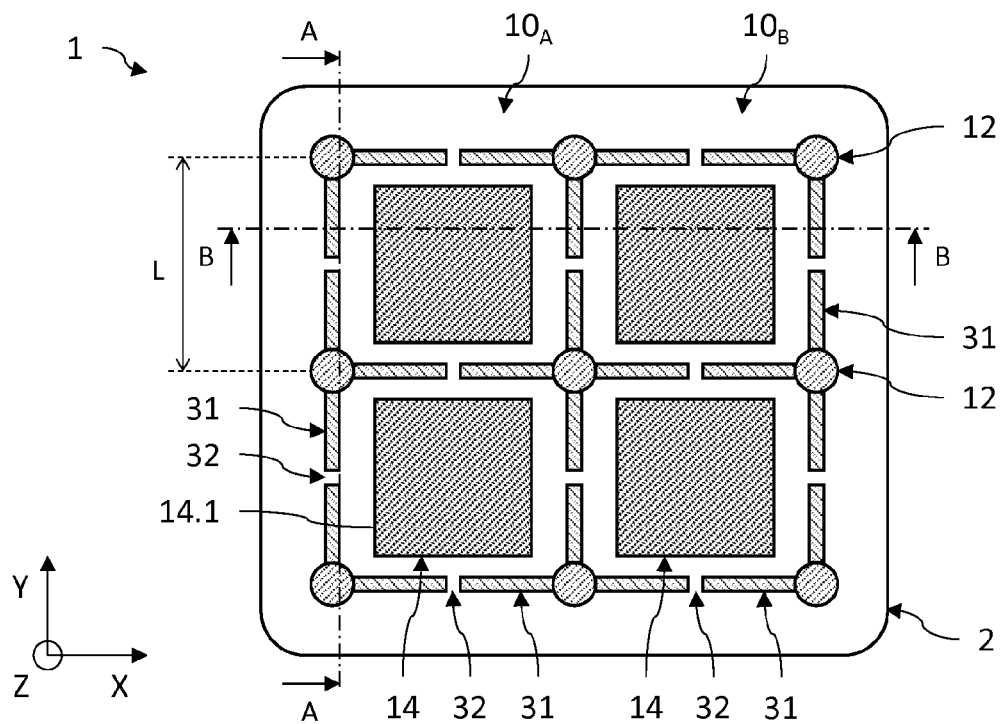

FIGS. 2A-2B and 3A-3B illustrate a device 1 for detecting electromagnetic radiation according to an embodiment. FIGS. 2A and 2B are plan views illustrating the suspended absorbent membranes 11 of the thermal detectors 10 (FIG. 2A) and the reflective layers 14 separated pairwise by opaque vertical walls 31 (FIG. 2B). FIGS. 3A and 3B are cross-sectional views of the detection device 1 along the cutting plane A-A (FIG. 3A) and along the cutting plane B-B (FIG. 3B).

Here and for the rest of the description, a direct three-dimensional reference frame (X, Y, Z) is defined, in which the plane (X, Y) is substantially parallel to the plane of a substrate 2 of the detection device 1, the Z axis being oriented in a direction substantially orthogonal to the plane of the substrate 2. The terms "vertical" and "vertically" are understood to be relative to an orientation substantially parallel to the Z axis, and the terms "horizontal" and "horizontally" are understood to be relative to an orientation substantially parallel to the plane (X, Y). Moreover, the terms "bottom" and "top" are understood to be relative to a progressive positioning moving away from the substrate 2 in the +Z direction.

In this example, the device 1 for detecting electromagnetic radiation is adapted to detect infrared radiation. It comprises a matrix of thermal detectors 10 forming sensitive pixels, disposed here in a 2×2 matrix. This example is given purely as an illustration, more complex matrices being able to be produced, for example ranging up to 1024×768 sensitive pixels 10.

It comprises a substrate 2, for example produced based on silicon, comprising a readout circuit produced in CMOS technology, making it possible to apply the electrical biases necessary to the operation of the thermal detectors 10 and to read the signals from the latter in response to the detection of the electromagnetic radiation of interest.

The readout circuit can comprise a bottom part (not represented) formed by electronic devices of MOS type, for example transistors, diodes, capacitors, adapted to implement the various electronic functions of the readout circuit. It also comprises several levels of electrical interconnections ensuring the electrical links between the different MOS devices and the thermal detectors 10, and the electrical link to at least one electrical contact (not represented) for connecting the readout circuit with the outside of the detection device 1.

The readout circuit thus comprises several levels of electrical interconnections each formed by a plurality of substantially planar metal lines linked to the metal lines of the lower levels by electrically conductive vias 22, or vertical connections. The different levels of electrical interconnections are separated from one another by dielectric layers 24, called intermetal dielectrics (or IMD), the latter being passed through vertically by the conductive vias 22. Each intermetal dielectric layer 24 can be produced in a silicon oxide $SiO_x$, or a silicon nitride $SiN_x$, even an alloy based on silicon oxide exhibiting a low relative permittivity, such as SiOF, SiOC, SiOCH, etc.

In this example, the readout circuit comprises a top metal interconnection level formed by a first portion 21 of metal line, situated facing a thermal detector 10, and intended to be linked electrically to this detector 10. The portions 21 of metal line of this metal interconnection level are linked electrically to portions 23 of metal line of lower level by conductive vias 22. These portions and the conductive vias are insulated electrically from one another by an intermetal dielectric layer 24.

The substrate 2 can further comprise an etch stop layer (not represented) which covers the surface formed by the portions 21 of metal line and by the intermetal dielectric layer 24. This etch stop layer is notably adapted, if necessary, to ensure a protection of the substrate 2 and of the readout circuit with respect to a chemical attack, for example in an HF acid (hydrofluoric acid) medium, applied to etch a part of a sacrificial layer used in the production of the detection device 1. This etch stop layer thus forms a hermetic and chemically inert layer ensuring a protection of the intermetal dielectric layers and of the underlying metal lines from chemical attack, and is electrically insulating to avoid any electrical short circuit between the metal line portions. The etch stop layer can be produced in alumina $Al_2O_3$, even in aluminum nitride or fluoride. It can have a thickness of between a few tens and a few hundreds of nanometers, for example between 10 nm and 500 nm.

The thermal detectors 10 each comprise a portion adapted to absorb the radiation to be detected. This absorbent portion is thermally insulated from the substrate 2 and is disposed at the level of a membrane 11, called absorbent membrane, suspended above the substrate 2 by securing elements and thermal insulation such as anchoring pillars 12 associated with thermal insulation and holding arms 13.

The anchoring pillars 12 are electrically conductive and pass locally through the etch stop layer to ensure an electrical contact with the portion 21 of the metal line. The absorbent membrane 11 is spaced apart from the substrate 2, more particularly from the reflective layer 14, by a distance H of typically between 1 µm and 5 µm, for example approximately 2 µm when the thermal detectors 10 are designed for the detection of infrared radiation with a wavelength of between 8 µm and 14 µm (atmospheric transmission LWIR band), thus forming a quarter-wave cavity 3 enhancing the absorption of the electromagnetic radiation by the suspended membrane 11. The anchoring pillars 12 can take the form of a rod or column, of straight section in the plane XY, substantially rounded (for example circular), even polygonal (for example square or rectangular), with a surface area for example of between 0.05 µm² and 5 µm², for example equal to 0.2 µm². They can be produced based on copper or tungsten, for example made of Cu, W, or WSi, and, if necessary, comprise a titanium-based barrier layer.

Each sensitive pixel 10 further comprises a reflective layer 14 resting on the substrate 2, and, in this example, resting on the etch stop layer. As described later, it can, as a variant, be situated under the etch stop layer and be formed by a portion of metal line of the top interconnection level. The reflective layer 14 can be produced in at least one metal material, for example in at least one material based on copper, aluminum, even tungsten. In the case where it is situated under an etch stop layer, it can be formed by one and the same continuous layer extending under each sensitive pixel. Each reflective layer 14 is then a zone of the same continuous reflective layer.

Hereinafter in the description, the thermal detectors 10 are bolometers whose absorbent membrane 11 comprises a thermistor material whose electrical conductivity varies as a function of the heating of the absorbent membrane 11. However, this example is given purely as an illustration and is in no way limiting. Any other type of thermal detector 10 can be used, for example pyroelectric and ferroelectric detectors, even thermopiles.

The thermal detectors 10 can be brought close to one another, notably by linking the holding arms 13 of different thermal detectors 10 to one and the same anchoring pillar 12, the readout architecture of the thermal detectors then being adapted, as the documents EP1106980 and EP1359400 describe. The result thereof is an enhancement of the sensitivity of the detectors through the elongation of the holding arms 13 and an increasing of the fill factor by the reduction of the surface area of each sensitive pixel 10 not dedicated to the absorption of the electromagnetic radiation. The detection device 1 is thus particularly suited to small matrix pitches, in particular to a pitch less than or equal to 12 µm.

The detection device 1 comprises at least one opaque vertical wall 31 situated between two adjacent sensitive pixels 10, and produced in a material that is opaque to the electromagnetic radiation to be detected, that is to say one in which the transmission of the electromagnetic radiation to be detected is less than or equal to 5%, even less than or equal to 1%. It is configured to limit the crosstalk between two adjacent sensitive pixels 10. The crosstalk, or optical crosstalk, is the phenomenon of influence of one sensitive pixel 10 on its neighbors. Here, it is notably the detection by a sensitive pixel 10A of a part of incident electromagnetic radiation on an adjacent sensitive pixel 10B having been reflected by the reflective layer 14. The crosstalk leads to a reduction of the contrast of a detected image, and therefore into a degradation of the modulation transfer function (MTF) of the detection device 1.

Thus, in this example, the opaque vertical wall 31 is disposed between two adjacent sensitive pixels 10, and more specifically is situated between the absorbent membrane 11 of one sensitive pixel 10A and that of the adjacent sensitive pixel 10B. It extends longitudinally substantially parallel to the border 11.1 of an absorbent membrane 11. It can be rectilinear, as illustrated in FIG. 2B, it can even be curved, or it can be formed by several rectilinear and pairwise-inclined portions. It extends vertically, along the Z axis, from the substrate 2, substantially orthogonally thereto.

Generally, as detailed later, the opaque vertical wall 31 can be produced in a single piece with an anchoring pillar 12 (see FIG. 2B) or be distinct from the anchoring pillars, that is to say not physically linked to the latter (see FIGS. 5B and 5C). Preferably, each opaque vertical wall 31 is at a distance from the holding arms 13 and from the absorbent membranes 11 of the different sensitive pixels 10, so as to avoid any disturbance of the thermal and/or electrical properties of the thermal detectors 10. In this case, the spacing between the opaque vertical wall 31 on the one hand and the holding arms 13 and the absorbent membranes 11 on the other hand can be a vertical spacing (along the Z axis) and/or a horizontal spacing (in the plane XY). Preferably, it is also at a distance from the reflective layers 14 of the adjacent sensitive pixels 10, notably when the opaque vertical walls 31 are produced in a single piece with the anchoring pillars 12, so as to avoid, if appropriate, electrically short-circuiting the anchoring pillars 12 by the reflective layer 14.

Each opaque vertical wall 31 has a length greater than its width, with, for example, a length/width ratio greater than or equal to 2, preferably greater than or equal to 5, even to 10. As an illustration, it can thus have a width of 500 nm or even less, and a length of 5 µm or even more. The width of each opaque vertical wall 31 can be of the order of a few hundreds of nanometers to a few microns. It is preferably less than 1 µm, and preferably less than or equal to 500 nm.

Preferably, the length of at least one opaque vertical wall 31 situated between two adjacent sensitive pixels 10 is greater than or equal to 50%, 75% and preferably 90% of the length L of a side of a sensitive pixel. Here, the length L of a side of a sensitive pixel is defined as being the distance separating the center of two anchoring pillars 12 of the sensitive pixel, the centers of the anchoring pixels 12 being projected orthogonally on an axis parallel to a border 11.1 of the absorbent membrane 11 of the sensitive pixel concerned. Alternatively, as illustrated in FIG. 2B, several opaque vertical walls 31 can extend longitudinally facing one and the same border 11.1 of an absorbent membrane 11, and thus form a longitudinal set of opaque vertical walls 31. The aggregate length of this longitudinal set of opaque vertical walls 31 can then be greater than or equal to 50%, preferably 75%, even 90%, to the length L of a side of a sensitive pixel.

In the case where several opaque vertical walls 31 form one and the same longitudinal set, the opaque vertical walls 31 are advantageously spaced apart pairwise, on the longitudinal axis, by a distance less than or equal to $\lambda_o/10$, even to $\lambda_o/20$, $\lambda_o$ being a central wavelength of the range of wavelengths of the electromagnetic radiation to be detected, for example equal to approximately 10 µm or 11 µm for a range of wavelengths of the electromagnetic radiation to be detected ranging from 8 µm and 14 µm. The distance can thus be less than or equal to 1.4 µm, for example less than or equal to 1.2 µm, for example equal to approximately 1 µm, even equal to approximately 500 nm. Thus, this vertical opening 32 separating two opaque vertical walls 31 of the same longitudinal set makes it possible to limit the crosstalk inasmuch as the light beam "sees" one and the same continuous opaque vertical wall and not two opaque vertical walls at a distance from one another. Furthermore, this vertical opening makes it possible to avoid any risk of electrical short-circuit between the anchoring pillars, in particular when two consecutive opaque vertical walls are electrically connected to distinct anchoring pillars. Moreover, this vertical opening also makes it possible to speed up the etching of the sacrificial material used in the production of the absorbent membrane 11 (detailed later) and make the evacuation thereof more effective.

In this example, as FIG. 3A illustrates, the vertical opening 32 has a height on the Z axis equal to the height of the two opaque vertical walls 31, such that these opaque vertical walls 31 are distinct from one another. As a variant, two consecutive opaque vertical walls 31 may not be distinct and can thus be linked to one another by a longitudinal portion (not represented), such that the vertical opening 32 has a height less than the height of said opaque vertical walls 31. In this case, these consecutive opaque vertical walls 31 are not electrically connected to distinct anchoring pillars, to thus avoid electrically short-circuiting the sensitive pixel 10.

As FIG. 3B illustrates, each opaque vertical wall 31 can have a height $h_p$ configured to limit notably the reception, by the absorbent membrane 11 of a sensitive pixel 10A, of a part of the incident electromagnetic radiation on the adjacent sensitive pixel 10B that has been reflected by its reflective layer 14. This height $h_p$ is preferably greater than or equal to $d_p/\tan(\alpha)$, in which $d_p$ is the average distance separating the border of a reflective layer 14 of a sensitive pixel 10 from the facing border of the opaque vertical wall 31, and a being the minimum angle relative to the normal formed by a beam of the electromagnetic radiation reflected by the reflective layer 14 of the sensitive pixel 10B and detected by the absorbent membrane 11 of the adjacent sensitive pixel 10A. To the first order, $\tan(\alpha)=e/H$ in which e is the average distance separating the border 14.1 of a reflective layer 14 of a sensitive pixel 10 with respect to the facing border of the absorbent membrane 11 of the adjacent sensitive pixel 10, and H being the distance along the Z axis separating the reflective layer 14 from an absorbent membrane 11, that is to say the height of the quarter-wave cavity 3 situated under the absorbent membrane 11. Each or some of the opaque vertical walls 31 can have a height $h_p$ that also makes it possible to limit the transmission of a part of incident radiation on the adjacent sensitive pixel 10B, that has been transmitted by the absorbent membrane 11 of the pixel 10B toward the reflective layer 14 of the sensitive pixel 10A. Generally, the height $h_p$ of the opaque vertical walls 31 is advantageously greater than or equal to 90% of the height H of the quarter-wave cavity 3, the latter being substantially equal to the height of the anchoring pillars 12.

Each opaque vertical wall 31 is produced in at least one material that is opaque to the electromagnetic radiation to be detected. For radiation having a wavelength range lying for example between approximately 8 µm and 14 µm, the opaque vertical wall 31 can thus be produced in copper, tungsten, aluminum, among others, and the alloys thereof. An enclosure based on titanium, for example made of Ti, TiN or TiW, or based on tantalum, for example Ta or TaN, can surround the periphery of a core produced based on Cu, W. This enclosure can ensure barrier layer functions with respect to the possible diffusion of the copper or of the tungsten. This enclosure has a thickness of the order of a few tens of nanometers, and does not modify the optical properties of the opaque vertical wall 31. Generally, "based on a chemical element" is understood to mean that the material is formed by this chemical element, or is an alloy formed by at least this chemical element. Preferably, the opaque vertical wall 31 is produced in a material that is reflective to the electromagnetic radiation to be detected, such as copper, tungsten and aluminum, among others, and the alloys thereof, thus making it possible to enhance the modulation transfer function (MTF) of the detection device.

Preferably, each sensitive pixel 10 is bordered by at least one opaque vertical wall 31 which extends between this sensitive pixel 10 and an adjacent sensitive pixel 10. Also, the set of the opaque vertical walls 31 forms an optical insulation structure, of cellular form, each cell being a cavity in which there is a thermal detector 10 intended to receive the electromagnetic radiation to be detected. This optical insulation structure thus makes it possible to greatly limit the crosstalk between the sensitive pixels 10.

The optical insulation structure thus comprises at least one opaque longitudinal part situated between the absorbent membranes 11 of the two adjacent sensitive pixels 10, which extends along a longitudinal axis substantially parallel to the borders 11.1 of said absorbent membranes 11. Preferably, each sensitive pixel 10 is surrounded by four opaque longitudinal parts. Each opaque longitudinal part is formed by at least one opaque vertical wall 31, extending from the substrate 2 along a vertical axis substantially parallel to the Z axis. Each opaque vertical wall 31 is disposed between the two adjacent sensitive pixels 10, and therefore between the absorbent membranes 11 of said sensitive pixels 10. The opaque vertical walls 31 surrounding one and the same sensitive pixel 10 are advantageously distinct from one another, so as to speed up the etching of the sacrificial material used in the production of the quarter-wave cavity 3 (described later) and to allow an effective evacuation thereof, while obviating, if appropriate, the risks of electrical short-circuiting of the sensitive pixel. They are preferably spaced apart from one another by a distance less than or equal to $\lambda_o/10$, even $\lambda_o/20$, for example by a distance less than or equal to 1.4 µm, even 1 µm or less.

In the example illustrated in FIG. 2B, the opaque vertical walls 31 of the optical insulation structure extend longitudinally along an axis passing advantageously through two anchoring pillars 12, thus making it possible to maximize the fill factor, that is to say the ratio between the surface of the absorbent membrane 11 to the total surface area of the sensitive pixel 10, in the plane of the substrate 2.

Furthermore, the opaque vertical walls 31 are advantageously produced here in a single piece with the anchoring pillars 12, thus enhancing the mechanical resistance of the opaque vertical walls 31. Thus, the opaque vertical walls 31 and the anchoring pillars 12 are preferably produced in the same materials, which simplifies the steps of the method for fabricating the detection device 1.

Opaque vertical walls 31 can be situated under holding arms 13 on the Z axis, that is to say can be situated in line with the holding arms 13, even under absorbent membranes 11. As FIG. 3B illustrates, the opaque vertical walls 31 then have a height $h_p$ less than the height H of the quarter-wave cavity 3 to avoid contacting the holding arms 13 and the absorbent membranes 11. Thus, the optical insulation structure causes no or virtually no degradation of the thermal and/or electrical properties of the thermal detectors. As an example, the opaque vertical walls 31 can be spaced apart from the holding arms 13 and/or from the absorbent membranes 11 by a distance greater than or equal to 100 nm, for example equal to 200 nm. This distance can be of the order of 10% of the height H of the quarter-wave cavity 3. Other opaque vertical walls 31 may not be situated in line with a holding arm 13 or an absorbent membrane 11, and have a height $h_p$ greater than or equal to the height H of the quarter-wave cavity 3. Such walls 31 can thus have a height equal to that of the anchoring pillars 12 (see for example FIG. 5D described later).

Thus, the detection device 1 according to the embodiment exhibits a crosstalk that is reduced by the presence of at least one opaque vertical wall 31 disposed between two adjacent sensitive pixels 10, in particular when each sensitive pixel 10 is optically separated from its neighbor by such an opaque vertical wall 31. The fact that the opaque vertical walls 31 which surround one and the same sensitive pixel 10 are distinct from one another makes it possible to increase the speed of the etching reaction and make the evacuation of the sacrificial material used in the production of the absorbent membranes 11 more effective. Moreover, the fact that the opaque vertical walls 31 are situated longitudinally on an axis passing through anchoring pillars 12 makes it possible to increase the fill factor.

The detection device 1 according to the invention is thus distinguished from that described in the patent application EP2447688 which comprises a reference thermal detector that is totally optically insulated from its environment by an absorbent cap. This thermal detector has the same absorbent structure as the sensitive pixels, but cannot therefore be qualified as a sensitive pixel inasmuch as it is not intended to receive the electromagnetic radiation to be detected. Also, this detection device according to this document of the prior art does not provide means configured to reduce the crosstalk between the adjacent sensitive pixels 10.

The detection device 1 according to the invention is also distinguished from that described in the patent application EP3067674 which comprises vertical walls disposed between two neighboring sensitive pixels 10. In fact, these vertical walls are portions of the encapsulation cap produced, by definition, in a material that is transparent to the electromagnetic radiation to be detected. This detection device according to this document of the prior art likewise does not provide any structural means configured to reduce the crosstalk between the adjacent sensitive pixels 10.

FIGS. 4A to 4I illustrate different steps of a method for producing the detection device 1 according to an embodiment which differs from that illustrated in FIGS. 2A-2B and 3A-3B essentially in that the reflective layers 14 are formed by portions of the metal line of the top level of the readout circuit.

Referring to FIG. 4A, a substrate 2 is produced comprising a readout circuit of CMOS circuit type that is capable of powering and measuring the signal delivered by the thermal detectors. It thus comprises active electronic elements, such as diodes, transistors, capacitors, resistors, etc., electrically connected by metal interconnections to the thermal detectors, and to one or more connection contacts (not represented) intended to electrically link the detection device 1 to an external electronic device. As described previously, the readout circuit here comprises an electrical interconnection level comprising a first portion 21 of a metal line, electrically linked to a portion 23 of metal line of a lower-level electrical interconnection by a conductive via 22, and a second portion 14 of the same metal line intended to form the reflective layer. The metal vias and lines are separated from one another by intermetal dielectric layers 24. The substrate 2 here comprises a top face with which the portions 21, 14 of the same metal line and the intermetal dielectric layer 24 are flush. This step of production of the substrate 2 can be identical or similar to that described in document EP2743659.

An etch stop layer 40 is deposited on at least part of the top face of the substrate 2. Said etch stop layer 40 thus continually covers the intermetal dielectric layer 24, the first portion 21 of metal line, and the reflective layer 14. The etch stop layer 40 comprises a material that is substantially inert to chemical etching implemented subsequently to eliminate the mineral sacrificial layer or layers, more specifically a chemical attack in an HF medium in vapor phase. The etch stop layer 40 can thus prevent the intermetal dielectric layers of the CMOS circuit from being etched during the steps of elimination of the sacrificial layers. It can be formed by alumina $Al_2O_3$, even aluminum nitride, aluminum trifluoride, or unintentionally doped amorphous silicon. It can be deposited for example by ALD (atomic layer deposition) and have a thickness for example of the order of from ten or so nanometers to a few hundreds of nanometers, for example a thickness lying between 20 nm and 150 nm.

Referring to FIGS. 4B and 4C (FIG. 4B being a view along the cutting plane C-C of FIG. 4C), a sacrificial layer 41 made of a preferably mineral material, for example of silicon oxide deposited by PECVD (plasma enhanced chemical vapor deposition) is deposited on the substrate 2. It extends continually over substantially all the surface area of the substrate 2 which covers the etch stop layer 40. In this example in which the opaque vertical walls 31 are intended to be situated under the holding arms 13 and/or under the absorbent membranes 11, the thickness on the Z axis of the sacrificial layer 41 here defines the height $h_p$ of the opaque vertical walls 31 which will then be produced.

Vertical orifices 42 are then produced which are intended for the formation of the anchoring pillars 12, and trenches 43 are also produced that are intended for the formation of the opaque vertical walls 31. The vertical orifices 42 and the trenches 43 are advantageously produced concomitantly, that is to say simultaneously. They are produced by photolithography and etching. The vertical orifices 42 pass through the sacrificial layer 41 and the etch stop layer 40 to emerge respectively on the first portion 21 of metal line. The vertical orifices 42 can have a straight section in the plane (X, Y) of rounded form, for example circular, even polygonal, and of surface area substantially equal here to 0.2 $\mu m^2$. The trenches 43 pass through the sacrificial layer 41 to emerge here on the etch stop layer 40. The trenches 43 extend longitudinally in the plane (X, Y) so as to be situated between two adjacent sensitive pixels 10. Here they have a width in the plane (X, Y) of a dimension substantially equal to 0.5 μm, even less. In this example, the trenches 43 emerge longitudinally on the vertical orifices 42, since the opaque vertical walls 31 will be produced here in a single piece with the anchoring pillars 12.

Referring to FIGS. 4D and 4E (FIG. 4D being a view along the cutting plane C-C and FIG. 4E being a view along the cutting plane D-D), a bottom part 12.1 of the anchoring pillars 12 is then produced in the vertical orifices 42, and the opaque vertical walls 31 are produced in the trenches 43. The bottom part 12.1 of the anchoring pillars 12 and the opaque vertical walls 31 can here be produced simultaneously. They are also produced in a single piece, that is to say each opaque vertical wall 31 has a continuity of material with an anchoring pillar 12. They are produced by filling the vertical orifices 42 and the trenches 43 with one or more electrically conductive and optically opaque materials. By way of example, they can comprise a barrier layer based on titanium deposited by MOCVD (metal organic chemical vapor deposition) on the flanks of the vertical orifices 42 and of the trenches 43, and a core based on copper or tungsten deposited for example by ECD (electrochemical deposition), even based on aluminum, filling the space delimited transversely by the attachment layer. The opaque vertical walls 31 can thus be produced concomitantly with the formation of the bottom parts 12.1 of the anchoring pillars 12, and identically in terms of materials. A CMP step then makes it possible to planarize the top surface formed by the sacrificial layer 41, the bottom part 12.1 of the anchoring pillars 12 and the opaque vertical walls 31.

Referring to FIGS. 4F and 4G (FIG. 4F being a view along the cutting plane C-C and FIG. 4G being a view along the cutting plane D-D), the top part 12.2 of the anchoring pillars 12 is then produced. For that, a second sacrificial layer 44 is deposited on the first sacrificial layer 41, and vertical orifices are produced through the thickness of the second sacrificial layer 44 to emerge on the bottom part 12.1 of the anchoring pillars 12. The top part 12.2 of the anchoring pillars 12 is then produced in a way that is identical or similar to the step of production of the bottom part 12.1. Anchoring pillars 12 are thus obtained whose height corresponds to the desired height H of the quarter-wave cavity 3. Here they have a height H greater than that $h_p$ of the opaque vertical walls 31, thus making it possible to produce the absorbent membranes 11 without the risk of thermal and/or electrical contact with the opaque vertical walls 31. As a variant, the top part 12.2 of the anchoring pillars 12 can be produced by deposition of a continuous metallic layer, produced for example based on TiN and Al, then etching of the continuous metallic layer so as to keep only metal blocks above the bottom parts 12.1, thus forming the top parts 12.2. The top part 12.2 of the anchoring pillars 12 can have a thickness of the order of one to a few hundreds of nanometers, for example of the order of 100 to 200 nm.

The holding arms 13 and the absorbent membranes 11 are then produced. This step can be performed in a way that is identical or similar to that described in the document EP2743659 and is not repeated in detail. Thus, the absorbent membrane 11 can comprise a first material suitable for absorbing the electromagnetic radiation of interest and a second thermistor material whose electrical conductivity varies as a function of the heating of the membrane.

Referring to FIGS. 4H and 4I (FIG. 4H being a view along the cutting plane C-C and FIG. 4I being a view along the cutting plane D-D), the sacrificial layers 41, 44 are etched so as to suspend the absorbent membrane 11. The etching can be performed by a chemical attack with hydrofluoric acid (HF) in the vapor phase. The chemical attack etches substantially all the sacrificial layers 41, 44 situated at the thermal detector 10 level, thus making it possible to suspend the absorbent membrane 11 above the substrate 2. The chemical attack reaction is thus more rapid and the products of the chemical attack reaction can be evacuated effectively through the vertical openings 32 which separate the opaque vertical walls 31 from one another, such that residues of sacrificial material are virtually no longer present in the quarter-wave cavity 3. Furthermore, the small dimension of the vertical openings 32 separating the opaque vertical walls 31 also makes it possible to limit the transmission of the electromagnetic radiation from one sensitive pixel 10 to another, thus reducing the crosstalk.

FIGS. 5A to 5C are plan views of detection devices according to different variant embodiments, which are distinguished from that illustrated in FIGS. 2A-2B and 3A-3B essentially by the arrangement of the opaque vertical walls 31 and the number and the disposition of the anchoring pillars 12. FIG. 5D is a cross-sectional view along the plane E-E of the variant illustrated in FIG. 5C.

Thus, FIG. 5A illustrates a detection device 1 in which each sensitive pixel 10 comprises two anchoring pillars 12 which are not shared with adjacent sensitive pixels 10. In this example, opaque vertical walls 31 are produced in a single piece with the anchoring pillars 12 while others are distinct therefrom. Moreover, two parallel rows of opaque vertical walls 31 are disposed between two adjacent sensitive pixels 10. Generally, this arrangement of opaque vertical walls 31 which surround the absorbent membrane 12 of each sensitive pixel 10 is particularly advantageous when these walls are produced in a reflective material, thus enhancing the modulation transfer function of the detection device 1.

FIG. 5B illustrates a detection device 1 in which the opaque vertical walls 31 are each distinct from the anchoring pillars 12. Thus, vertical openings 32 are formed between each opaque vertical wall 31 and the neighboring anchoring pillar 12, whose dimension in the plane XY is preferably less than or equal to $\lambda_o/10$, even $\lambda_o/20$, for example less than or equal to 1.4 µm. Each side of a reflective layer 14 is, here, bordered by a single opaque vertical wall 31. Moreover, a single opaque vertical wall 31 is situated between two adjacent reflective layers 14, thus making it possible to improve the fill factor associated with each sensitive pixel 10. Since the opaque vertical walls 31 are not in line with a holding arm 13 or an absorbent membrane 11, they can have a greater height $h_p$, for example can have the same height as the anchoring pillars 12, further reducing the crosstalk between the sensitive pixels 10.

FIGS. 5C and 5D illustrate a detection device 1 which differs from that illustrated in FIG. 5A essentially in that the opaque vertical walls 31 are not disposed longitudinally on an axis passing through two neighboring anchoring pillars 12, but surround not only the absorbent membrane 11 of the sensitive pixels 10, but also the anchoring pillars 12. The fill factor associated with each sensitive pixel 10 is not optimal, but the opaque vertical walls 31 here form several vertical openings 32 situated at the corners of the sensitive pixels 10 and in the middle of the borders 14.1 of the reflective layers 14, thus allowing for a faster etching of the sacrificial layer or layers and a greater evacuation of the sacrificial materials. Moreover, the opaque vertical walls 31 are not here situated under holding arms 13 or under absorbent membranes 11, so that they can have a height $h_p$ that is equal to, even greater than, the height H of the quarter-wave cavity 3. They can, for example, have a height $h_p$ that is substantially equal to the height of the anchoring pillars 12. Thus, the crosstalk between the sensitive pixels 10 is further reduced. The production of such a variant is simplified compared to that described with reference to FIGS. 4A-4I, inasmuch as there is no need to produce the top part 12.2 of the anchoring pillars 12.

Particular embodiments have just been described. Different variants and modifications will become apparent to the person skilled in the art.

Thus, FIG. 6A is a schematic and partial view of a detection device 1 according to another variant embodiment. FIGS. 6B, 6C, 6D is cross-sectional views of this detection device 1, respectively along the cutting planes A-A, B-B and C-C. The detection device is distinguished from those described previously essentially in that the opaque vertical walls 31 have a height along the Z axis that is substantially equal to that of the anchoring pillars 12. They surround the thermal detector 10 on its four sides in the plane XY. Each side is bordered by two opaque vertical walls which extend longitudinally coaxially, and are spaced apart in the plane XY by an opening 32. They have a thickness (or width) in the plane XY that is for example between 200 nm and 500 nm, and are spaced apart in the plane XY from one another by the opening 32 by a distance of between, for example, 200 nm and 1 µm. Each opaque vertical wall is produced in a single piece with an anchoring pillar 12 and in the same material or materials. Each holding arm 13 extends in the plane XY from an anchoring pillar 12. Here it borders two sides of the absorbent membrane 11 before being joined to it. Each holding arm 13 can have a width in the plane XY that is for example between 100 nm and 300 nm. Inasmuch as the opaque vertical walls 31 have a height equal to that of the anchoring pillars 12, the holding arms 13 are spaced apart from the latter in the plane XY by a distance that is for example between 100 nm and 300 nm. Thus, the detection device 1 here exhibits a reduced crosstalk and has a high fill factor. Moreover, the mechanical resistance of the walls 31 is reinforced by the fact that they are produced in a single piece with the pillars 12. Also, the method is simplified by the fact that the walls 31 and the pillars 12 are produced in one and the same step and with the same material or materials.

The invention claimed is:

1. A device for detecting electromagnetic radiation, comprising:
    a substrate comprising a readout circuit;
    a matrix of thermal detectors intended to absorb the electromagnetic radiation to be detected, disposed on the substrate, each thermal detector comprising:
    an absorbent membrane suspended above the substrate by anchoring pillars disposed on and in contact with the substrate, and by holding arms, the anchoring pillars and the holding arms ensuring an electrical connection of the absorbent membrane to the readout circuit, and
    a reflective layer disposed on the substrate facing the absorbent membrane;
    at least one opaque vertical wall, disposed on and in contact with the substrate and extending longitudinally between two adjacent thermal detectors, and made of a material that is opaque to the electromagnetic radiation to be detected,
    the opaque vertical wall extending longitudinally along an axis passing through two neighboring anchoring pillars;
    the opaque vertical wall is made as a single piece with at least one anchoring pillar.

2. The detection device as claimed in claim 1, wherein each thermal detector is surrounded, in a plane parallel to the substrate, by opaque vertical walls.

3. The detection device as claimed in claim 1, wherein each opaque vertical wall is made of the same material or materials as the anchoring pillars.

4. The detection device as claimed in claim 1, wherein the opaque vertical wall is at a distance from the holding arms and from the absorbent membrane.

5. The detection device as claimed in claim 1, wherein each thermal detector comprises four anchoring pillars, each of the sides of the absorbent membrane, in a plane parallel to the substrate, being bordered by at least two opaque vertical walls at a distance from one another along their longitudinal axis.

6. The detection device as claimed in claim 5, wherein said opaque vertical walls are at a distance from one another along their longitudinal axis by a distance less than or equal to $\lambda_o/10$, $\lambda_o$ being a central wavelength of a range of wavelengths of the electromagnetic radiation to be detected.

7. The detection device as claimed in claim 6, wherein said distance is less than or equal to 1.4 µm.

8. The detection device as claimed in claim 1, wherein one and the same thermal detector is surrounded by a plurality of opaque vertical walls that are distinct from one another and spaced apart from one another by a non-zero distance.

9. The detection device as claimed in claim 1, wherein the opaque material exhibits a transmission of the electromagnetic radiation to be detected less than or equal to 5%.

10. The detection device as claimed in claim 1, wherein the electromagnetic radiation to be detected exhibits a range of wavelengths of from 8 µm to 14 µm.

11. The detection device as claimed in claim 1, wherein one or more consecutive opaque vertical walls border one and the same side of a thermal detector in a plane parallel to the substrate over at least 50% of the length of the side.

12. A method for fabricating a detection device as claimed in claim 1, comprising:
    supplying the substrate;
    depositing a sacrificial layer on the substrate;
    producing at least one opaque vertical wall and anchoring pillars through the sacrificial layer;
    producing the holding arms and the absorbent membrane on the sacrificial layer;
    eliminating the sacrificial layer.

13. The method as claimed in claim 12, wherein the anchoring pillars and the opaque vertical wall are made simultaneously and of the same material or materials.

* * * * *